US007106318B1

(12) United States Patent
Liang et al.

(10) Patent No.: US 7,106,318 B1
(45) Date of Patent: Sep. 12, 2006

(54) LOW POWER LCD DRIVING SCHEME EMPLOYING TWO OR MORE POWER SUPPLIES

(75) Inventors: Jemm Y. Liang, San Jose, CA (US); Peter Xiao, San Jose, CA (US)

(73) Assignee: JPS Group Holdings, Ltd., Tortola (VG)

( * ) Notice: Subject to any disclaimer, the term of this patent is extended or adjusted under 35 U.S.C. 154(b) by 0 days.

(21) Appl. No.: 09/561,737

(22) Filed: Apr. 28, 2000

(51) Int. Cl.
*G09G 5/00* (2006.01)

(52) U.S. Cl. .......................... 345/211; 345/95
(58) Field of Classification Search ................ 345/87, 345/85, 79, 100, 96, 211, 43, 212, 95, 99; 307/110
See application file for complete search history.

(56) References Cited

U.S. PATENT DOCUMENTS

| | | | |
|---|---|---|---|
| 4,802,739 A * | 2/1989 | Iwamoto ...................... 307/110 |
| 5,229,761 A * | 7/1993 | Fuse ............................ 345/99 |
| 5,392,145 A * | 2/1995 | Edwards ...................... 345/43 |
| 5,510,814 A | 4/1996 | Ise |
| 5,663,743 A * | 9/1997 | Fujii et al. .................... 345/95 |
| 5,734,379 A | 3/1998 | Natsumi et al. |
| 5,739,803 A * | 4/1998 | Neugebauer ................. 345/100 |
| 5,764,225 A * | 6/1998 | Koshobu ..................... 345/211 |
| 5,838,289 A * | 11/1998 | Saito et al. ................... 345/79 |
| 5,859,632 A * | 1/1999 | Ito ............................. 345/211 |
| 5,943,033 A * | 8/1999 | Sugahara et al. ............. 345/85 |
| 6,124,840 A * | 9/2000 | Kwon ......................... 345/100 |
| 6,166,714 A * | 12/2000 | Kishimoto ................... 345/96 |
| 6,262,704 B1 * | 7/2001 | Kurumisawa et al. ....... 345/100 |

FOREIGN PATENT DOCUMENTS

| | | |
|---|---|---|
| EP | 0645751 A1 | 3/1995 |
| EP | 0721137 A | 7/1996 |
| WO | WO 87/05429 | 9/1987 |

OTHER PUBLICATIONS

"STN Displays and Active Addressing™," T.J. Scheffer et al., *electronicAsia 99, Display Technology Symposium*, Hong Kong, Oct. 14-15, 1999, pp. 1-37.
International Search Report mailed Aug. 10, 2001.
Chinese Office Action, Application No. 01810158.5 for JPS Group Holdings, Ltd, dated Oct. 28, 2005, 4 pages.

* cited by examiner

*Primary Examiner*—Kent Chang
(74) *Attorney, Agent, or Firm*—Parsons Hsue & de Runtz LLP

(57) ABSTRACT

Two separate power supplies are employed to generate electrical potentials for driving row and column electrodes of LCDs. One or more energy storage devices are preferably used together with the two power supplies for generating such potentials. In the first phase, the energy storage devices are charged and in the second phase, such devices and the power supplies are employed to generate the appropriate potentials for driving the row and column electrodes. Such schemes permit the column electrodes to be driven through a voltage range much smaller than the convention IAPT driving schemes and vastly reduces the power consumption by the driver. The total voltage dynamic range experienced by the driver circuit is comparable to the IAPT driving scheme.

23 Claims, 11 Drawing Sheets

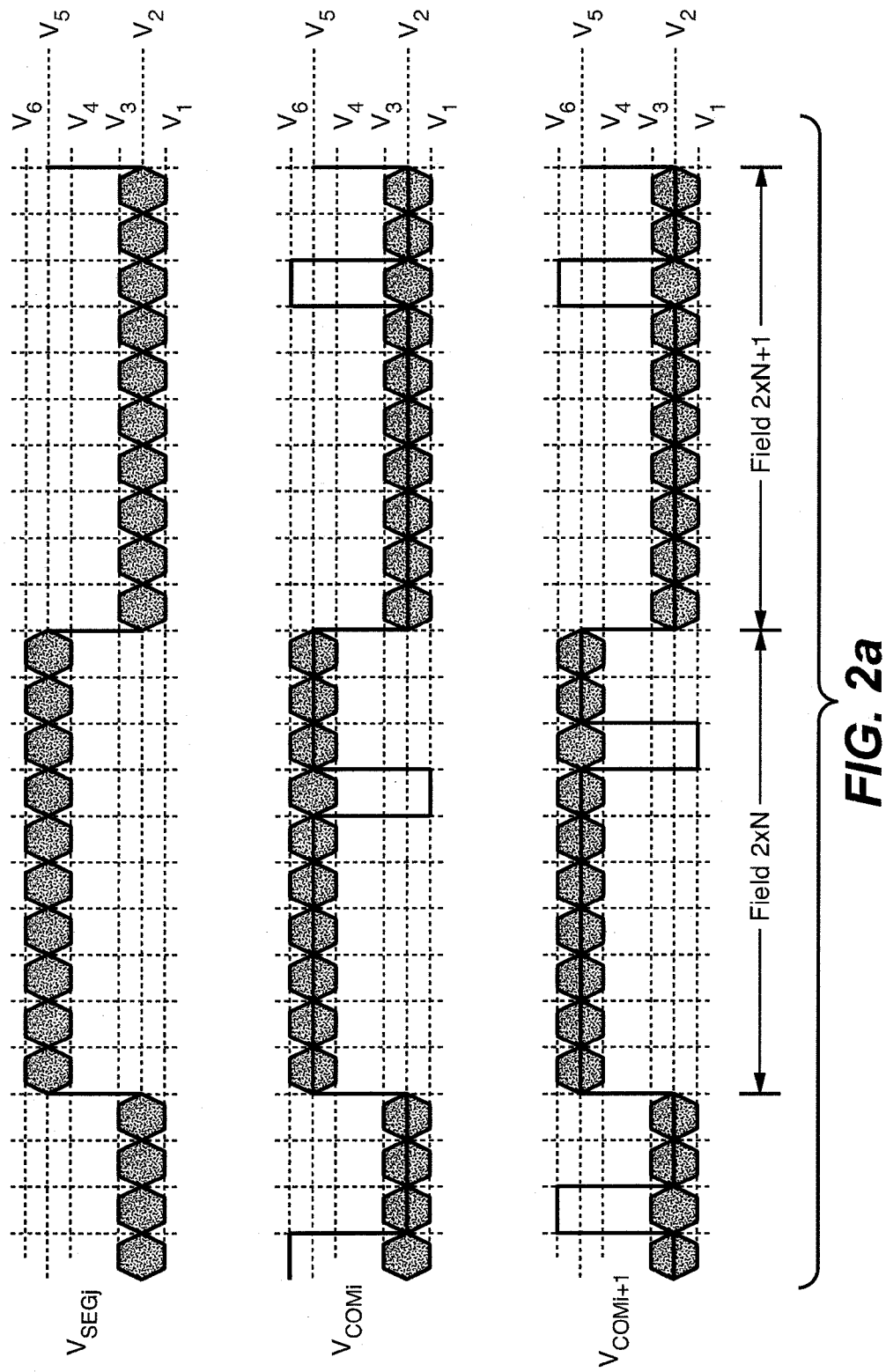

LOW POWER LCD DRIVING SCHEME EMPLOYING TWO OR MORE POWER SUPPLIES

BACKGROUND OF THE INVENTION

This invention relates in general to liquid crystal displays (LCDs) and, in particular, to a low power driving scheme for LCDs.

FIG. 1 is a schematic view of a LCD panel and its n row electrodes labeled COM 1, . . . COM n in FIG. 1, and k column electrodes shown as vertical rectangles labeled SEG 1~SEGk in FIG. 1. Not shown in FIG. 1 (to simplify the figure) is a layer of liquid crystal material between the row and column electrodes. Each row electrode will overlap a column electrode when viewed in a viewing direction, where the overlapping portion of the two overlapping electrodes will define a pixel of the LCD panel. When an appropriate voltage is applied across a particular row and a particular column electrode, a portion of the liquid crystal layer at the pixel between the overlapping row and column electrodes controls the light transmission or reflective properties of such portion.

FIG. 2a is a graphical illustration of the Improved Alto-Pleshko (IAPT) waveform for the row (or COM) electrodes and column (or SEG) electrodes. FIG. 2b is a graphical plot of the conventional Alto-Pleshko driving waveform for row (COM) and column (SEG) electrodes. In FIGS. 2a and 2b, voltages labeled $V_{COM}$ or variations thereof indicate voltage waveforms that are applied to the row electrodes and voltages labeled $V_{SEG}$ or variations thereof indicate voltage waveforms applied to column electrodes. The driving waveforms in FIGS. 2a and 2b are conventional. Referring to FIG. 1 and FIG. 2a, a typical configuration of passive LCD and a conventional driving waveform is illustrated. As demonstrated in FIG. 1, the ith row electrode is connected to a node at voltage $V_{COMi}$ on one side, and the jth column electrode is connected to a node at voltage $V_{SEGj}$ on the other side. In FIG. 2a, where vertical axis is voltage, and the horizontal axis time, the data signals $V_{SEGj}$ are also drawn as overlapped shaded region over $V_{COMi}$ signal to illustrate relative relationships between these two sets of signals.

The driving waveform demonstrated in FIG. 2a, is known as Improved Alto-Pleshko driving method (Improved APT, or IAPT for brief). The main characteristic is that the COM scanning pulses are "folded" such that the driving total voltage dynamic range is reduced as compared to the plain APT, as show in FIG. 2b. This reduced voltage range is considered to be advantageous in the conventional design technique used in CMOS integrated driver IC, where low MOS transistor break down voltage (caused by thin gate oxide used in fine gate geometry circuits and devices) would otherwise make the circuit design very difficult.

From the waveform of these signals it is observed that although the IAPT driving method reduces the voltage dynamic range for the drivers, but the power is increased as a consequence. This is because the LCD is a pure AC device and the capacitive load on column (SEG) electrodes can be quite significant. However, the current driving the column (SEG) electrodes also need to flow through the entire voltage range, although the column (SEG) electrode voltage swing, V6–V4, or V3–V1 as shown in FIG. 2a (these two value needs to be the same), as measured from "majority" COM electrode voltage (which is substantially the same as the non-scanning voltage $V_5$ in Field 2×N and $V_2$ in Field 2×N+1) is far smaller than the total supply voltage used in a conventional IAPT driving scheme (V6–V1 in FIG. 2a.).

According to conventional design principal, the ratio between (V6–V1) and (V3–V1) can be estimated roughly by $$\frac{\sqrt{Mux+1}}{2},$$

where Mux is the multiplexing rate (or duty factor), which is determined by the number of row/COM electrodes. Using this formula, for a moderate sized LCD of 81 rows (with 81 row/COM electrodes), the above ratio is 5×, and therefore, the power wasted for driving SEG electrodes (which is proportional to voltage V, assuming current I stays unchanged) can be as high as 80%.

As there will be only one COM electrode scanning while all SEG electrodes can change at each row scanning period, SEG/column electrode capacitive loading current can be more than ten times higher than COM/row electrode loading current. This obviously makes the low utilization of supplied SEG/column power very undesirable.

One of the most frequently heard complaints from users of portable computers, cellular phones and personal digital assistants is that these devices consume too much power so that one has to constantly change batteries, which is inconvenient. It is, therefore, desirable to provide a power saving scheme for driving LCD displays, especially for displays used in such portable devices.

SUMMARY OF THE INVENTION

This invention is based on the recognition that by using two separate power supplies to generate suitable electrical potentials for driving the row and column electrodes, the current driving the column (SEG) electrodes does not need to flow through the total supply voltage (V6–V1 in FIG. 2A), so that the power consumed by the LCD can be significantly reduced. Preferably, one of the electrical potentials caused to be generated using the two power sources and applied to the row and column electrodes floats with the voltage supplied by one of the power sources. This allows the dynamic range of electrical potentials driving the LCD to be reduced, thereby also allowing the size of semiconductor devices in a power circuit to be reduced. This enables cheaper driver systems to be manufactured for driving LCD displays.

Since the LCD is a pure AC device, signal pulses driving the LCD will be higher than a reference voltage such as ground in some field addressing cycles (e.g. positive going pulses) and lower than the reference voltage (e.g. negative going pulses) in other field addressing cycles. In one embodiment, by providing a voltage differential which is in turn used for generating both types of pulses, this ensures that no significant DC offset would develop across LCD pixels that can cause ionization of the liquid crystal material and damage the LCD permanently. In some embodiments, such voltage differential may be supplied directly by a voltage supply.

Preferably, an energy storage device is used in the low power driving scheme of this invention for generating electrical potentials suitable for driving the row and column electrodes. In a first phase of the operation of the scheme, one or more energy storage devices are charged, and in a second later phase, the energy stored is then used to drive the row and/or column electrodes. In some embodiments, power from the power sources may be used to both charge the energy storage devices as well to the drive row and/or column electrodes during the first phase.

In embodiments where one or more energy storage devices are employed, some of the current employed for driving the column electrodes in a field addressing cycle may be reused in a subsequent cycle for driving column electrodes.

BRIEF DESCRIPTION OF THE DRAWINGS

FIG. 2a is a graphical illustration of the conventional Improved Alto-Pleshko (IAPT) waveform for the row or COM electrodes and column or SEG electrodes.

FIGS. 4b and 4c are graphical plots of signal waveforms employed in the embodiment of FIG. 4a.

For simplicity in description, identical components are labeled by the same numerals in this application.

DETAILED DESCRIPTION OF THE EMBODIMENTS

Figure 2B:
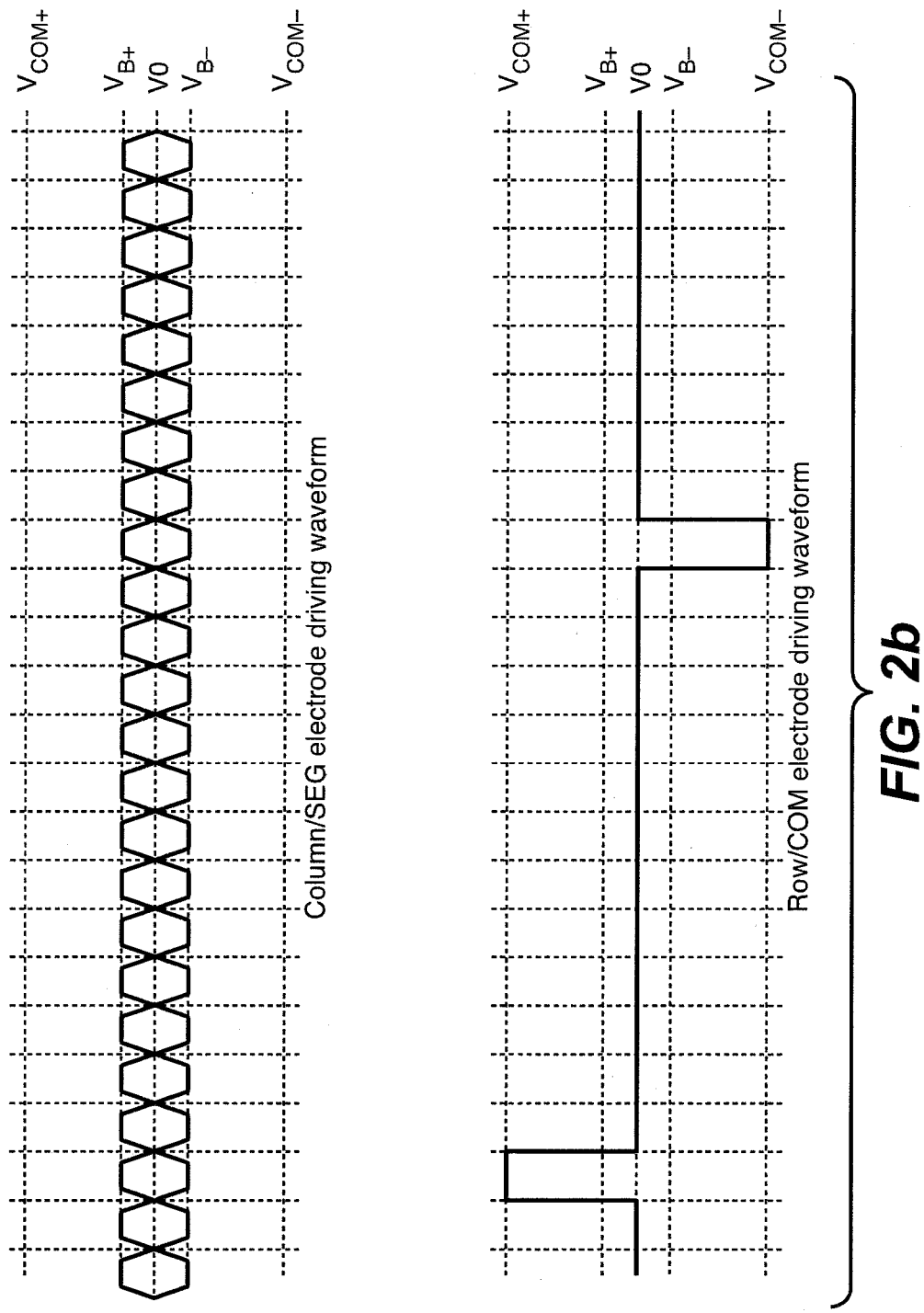
FIG. 2b is a graphical plot of the conventional Alto-Pleshko driving waveform for row (COM) and column (SEG) electrodes.

Referring to FIGS. 2a and 2b, it is observed that in both IAPT (FIG. 2a) and APT (FIG. 2b) driving schemes, during the period of one field, such as field 2×N or field 2×N+1 in FIGS. 2a, 2b (N being a positive integer), the SEG/column electrode voltage swings have a very limited dynamic range as compared to the COM/row electrode voltage swings. This invention involves the use of separate power supply systems to provide narrow range, voltage power supply for SEG/column drivers, and wide range voltage power supply for the COM/row drivers.

Floating $V_{COM}$ Embodiments

In an embodiment of the invention for obtaining the signals illustrated in FIG. 2b, one floating high voltage $V_{COM}$ supply or two fixed high voltage $V_{COM}$ supplies can be used for the COM electrodes (discussed below). Either way, due to the fact that the current used to supply power the column electrodes are driven through a very limited dynamic range, this causes the power consumption of such a modified system to be lower than the conventional one-power supply driving systems by as much as 80% (see calculation in the last paragraph).

Floating $V_{BIAS}$ Embodiments

Figure 3A:
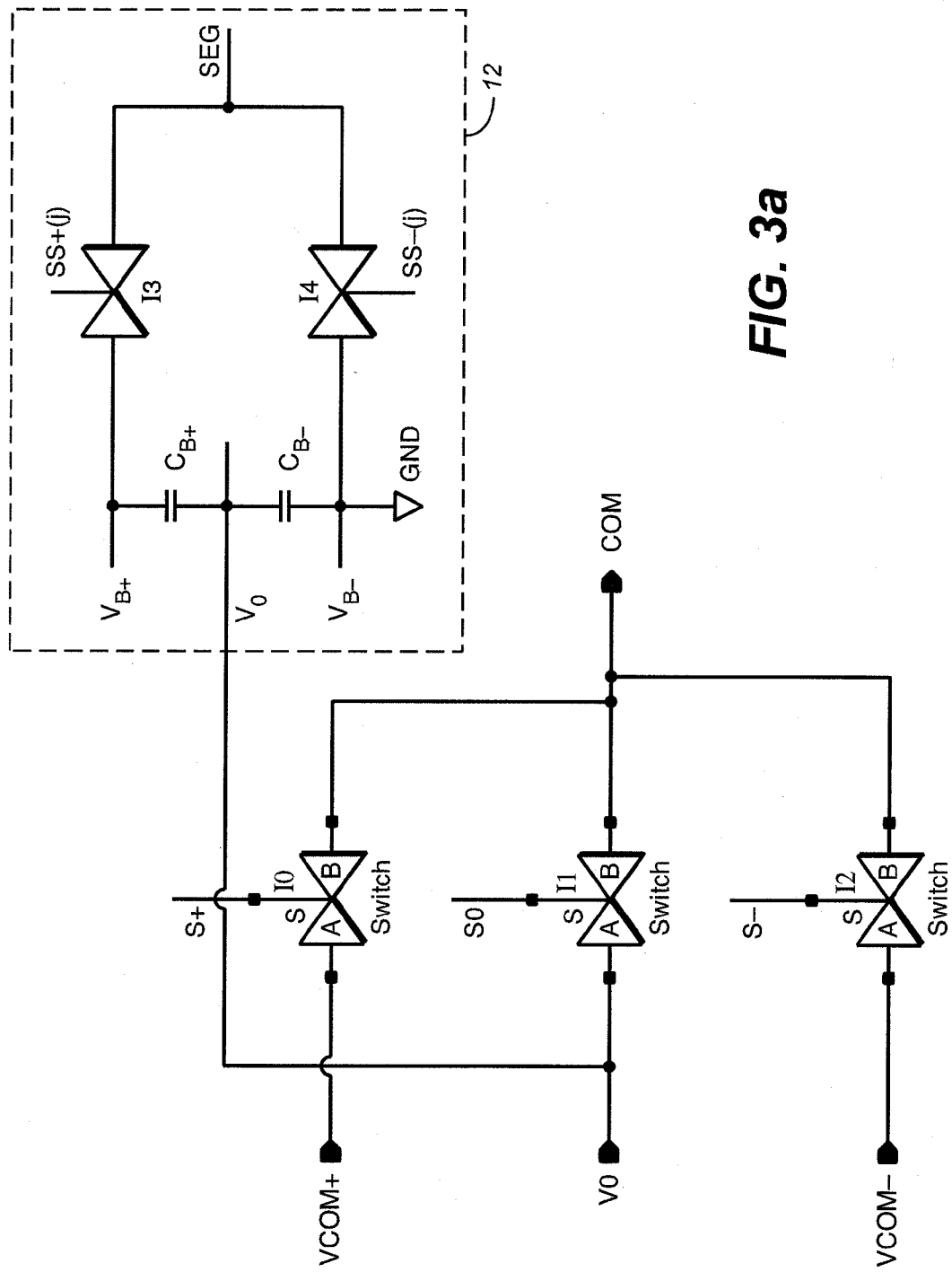
FIG. 3a is a schematic circuit diagram of a power supply circuit generating suitable electrical potentials for driving the row and column electrodes of a LCD to illustrate one embodiment of the invention.

In one embodiment of the invention for obtaining the signals illustrated in FIG. 2a, one floating low voltage supply system 12 in FIG. 3a provides electrical potentials $V_{B+}/V_0/V_{B-}$ that are used to supply the power for SEG/column switching. This $V_{BIAS}$ supply 12, by proper control of switches, will be switching between three states:

Charge: where a power source, such as a charge pump or an buffer amplifier, is used to charge up capacitors connected between $V_{B+}/V_0/V_{B-}$ periodically. The capacitors then provide two "operating voltages" for driving the column electrodes.

V-Low: where the $V_{B-}$ is connected to V1 and $V_0/V_{B+}$ will provide V2, and V3.

V-High: where the $V_{B+}$ is connected V6 and $V_0/V_{B-}$ will provide V5, and V4.

As will be discussed in detail in the following paragraphs, a floating $V_{COM}$ structure may be simpler than a floating $V_{BIAS}$ structure. In addition, there will be some minor power consumption for switching $V_{BIAS}$ between the three different states. However, a practical implementation of floating $V_{COM}$ structure in a single chip CMOS IC implementation may call for the use of triple well CMOS process, while the floating $V_{BIAS}$ structure can be achieved in the more conventional twin well CMOS process. Therefore the former approach (i.e. floating $V_{COM}$) is more suitable for larger LCDs where a multiple-chip solution is required to handle the driving loads, while the latter approach (i.e. floating $V_{BIAS}$) is more suitable for smaller LCD where single chip solution is more economical.

Either of these two scheme will achieve very significant power savings compared to conventional single power supply system by utilizing the power more efficiently.

Floating $V_{COM}$ Embodiments

Figure 3B:
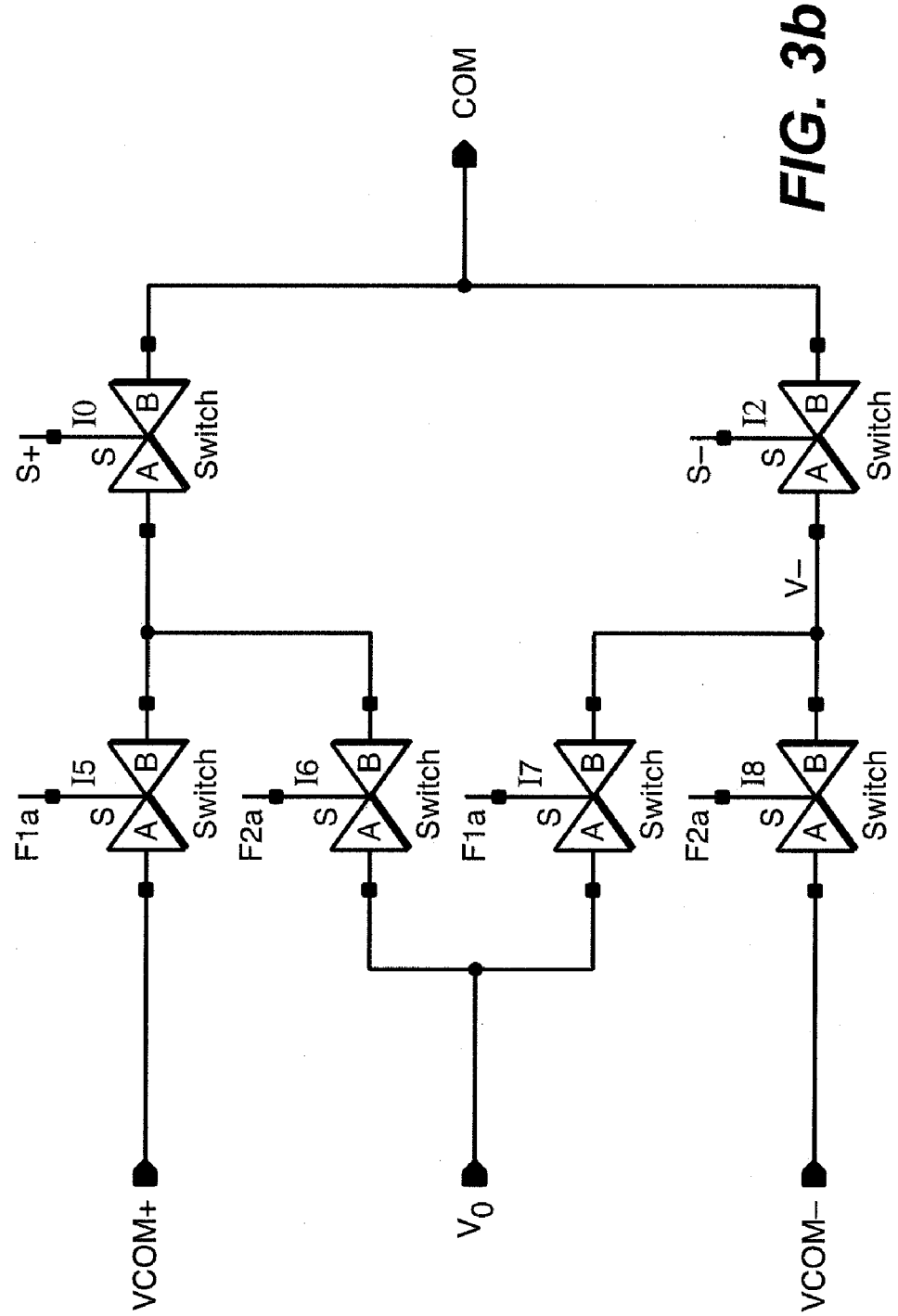
FIGS. 3b–3d are schematic circuit diagrams of portions of a power supply circuit generating electrical potentials suitable for driving the row and column electrodes of an LCD display to illustrate further embodiments.

Using Two Fixed $V_{COM}$ Supplies:

One of the embodiments of the invention involves the use of non-folding, APT driving scheme, (FIG. 2b) and utilizes two fixed $V_{COM}$ supplies as illustrated in FIG. 3a and FIG. 3b. AS will be understood by those in the art, while the driver circuit for driving only one row or column electrode is shown in the description below in reference to FIGS. 3a–3d, 4a–4c and 5a, 5b, similar circuits may be employed for driving other row and column electrodes. While all of the column electrodes need to be driven at the same time, in some embodiments, only one row electrode is scanned at any one time, so that by means of a switching circuit, only one driver may be adequate for driving sequentially all of the row electrodes.

In FIG. 3a, the COM or row electrode is scanned by application of either V0<=>$V_{COM+}$ pulses or V0<=>$V_{COM-}$ pulses, depending on the polarity of the row being scanned. These pulses are supplied to the connection node COM of each row electrode by applying appropriate timing signals S+, S0, S− to control the switches I0, I1, I2. The driving potential $V_{B+}$ or $V_{B-}$ is applied to a connection node SEG for each column electrode by applying suitable timing signals SS+(j), SS−(j) to switches I3, I4. The notations "SS+(j), SS−(j)" indicate timing signals suitable for the jth column electrode, where j ranges from 1 to the maximum number of column electrodes. The power consumption of the system is very efficient as compared to conventional single power supply IAPT driving system. As the power consumed by the SEG/column electrodes will be supplied by a dedicated $V_{BIAS}$ low voltage power supply, therefore the current loading of the SEG/column electrodes will have a lower V multiplier factor and therefore the system power requirements are reduced.

However, in this embodiment, $V_{COM+}$, $V_{COM-}$ are permanently connected to the rest of the driver circuit and therefore require the switch circuit 10 and 12 to tolerate a breakdown voltage of $|V_{COM+}-V_{COM-}|$. Since $|V_{COM+}-V0|=|V0-V_{COM-}|=V_{COM}$ and can be as high as 15~18V, the total breakdown requirement can be as much as 30~36V, which is quite expensive to achieve in fine geometry CMOS process. An improvement in this respect is therefore desirable.

FIG. 3b is a schematic view of a circuit diagram illustrating a portion of a power supply for generating electrical potentials suitable for driving a LCD. The portion of the power supply shown in FIG. 3b is for generating a suitable voltage for driving the row electrodes; the portion of the circuit used for generating electrical potentials for driving the column electrodes is similar to that of circuit block 12 of FIG. 3a. To simplify FIG. 3b, such circuit block is omitted, it being understood that such circuit block is connected to node V0 of FIG. 3b in the same manner as shown in FIG. 3a. The same is true for FIG. 3c. In FIG. 3b, an improved scheme is illustrated. In this scheme, there are still two fixed high voltage supplies, $V_{COM+}$ and $V_{COM-}$. However, two pairs of switches (I1/I5 and I4/I3) are used to select the power supply for all the row/COM electrode driving circuits. With these switches and the control signal F1a, F2a (where F1a is basically the inverse of F2a), according to APT driving technique, at any single time, only $V_{COM+}$, or only $V_{COM-}$ is applied, but never both. As a consequence, the voltage across switches I0 and I2 will be limited to $|V_{COM}|$ rather than $2\times|V_{COM}|$. For example in field 2N, only V0 and $V_{COM-}$ are applied. The break down requirement is therefore reduced by two as compared to FIG. 3a embodiment. In addition, all four power supply switches (I5, I6, I7, I8) only went through one $|V_{COM}|$ transition, and therefore is also required to tolerate one $V_{COM}$ for break-down tolerance.

The embodiment of FIG. 3b still requires two separate power supplies $V_{COM+}$ and $V_{COM-}$. A further enhancement to FIG. 3b is show in FIG. 3c. In this embodiment, only one voltage supply $V_{COM+}$ is used. In the positive cycle, signal F1a is High and switches I9, I11 are ON. The V+ connection node will connect to $V_{COM+}$ and V− will connect to V0, while capacitor C0 will be charged to $V_{COM+}$. In the negative cycle, F2a will be high, switch I10 will be ON, and the electrical potentials from COM/row scanning system 20 is supplied by capacitor C0, which was charged to $V_{COM+}$ during the positive cycle. With I10 turned ON, C0's top terminal is connected to V0, and therefore push C0's bottom terminal to $-V_{COM+}$, or $V_{COM-}$. As a result, by connecting different terminals of C0 to power supply $V_{COM+}$ and to reference node V0, and using the other terminal as $V_{COM+}$ or $V_{COM-}$, only one voltage source is required for the scanning of all row/COM electrode. This is possible because at any single moment of time, there will be only one row/COM electrode scanned in the APT driving scheme. This one single voltage source can supply the voltage required for both the polarity of row/COM scanning pulses.

This technique can be applied equally well to field inversion APT driving scheme (where the polarity will stay the same for all rows/COMs within one field, and change to another polarity for all rows/COMs for the next field), for row inversion APT driving scheme (where the polarity for one field will be +−+−+− for one field, and −+−+−+ for the next field, etc.) or other inversion driving scheme. Another important advantage of this single $V_{COM}$ scheme is the natural ability to provide balanced voltage supply to both of the polarity of driving signals. This balance is important as any significant DC offset applied across LCD pixels can cause ionization of LC (liquid crystal) material and damage the LCD permanently. By using only one supply voltage for $V_{COM}$, this balance is automatically established; otherwise, this may require additional high breakdown voltage feedback control circuits and may be difficult and costly to accomplish.

Figure 3C:
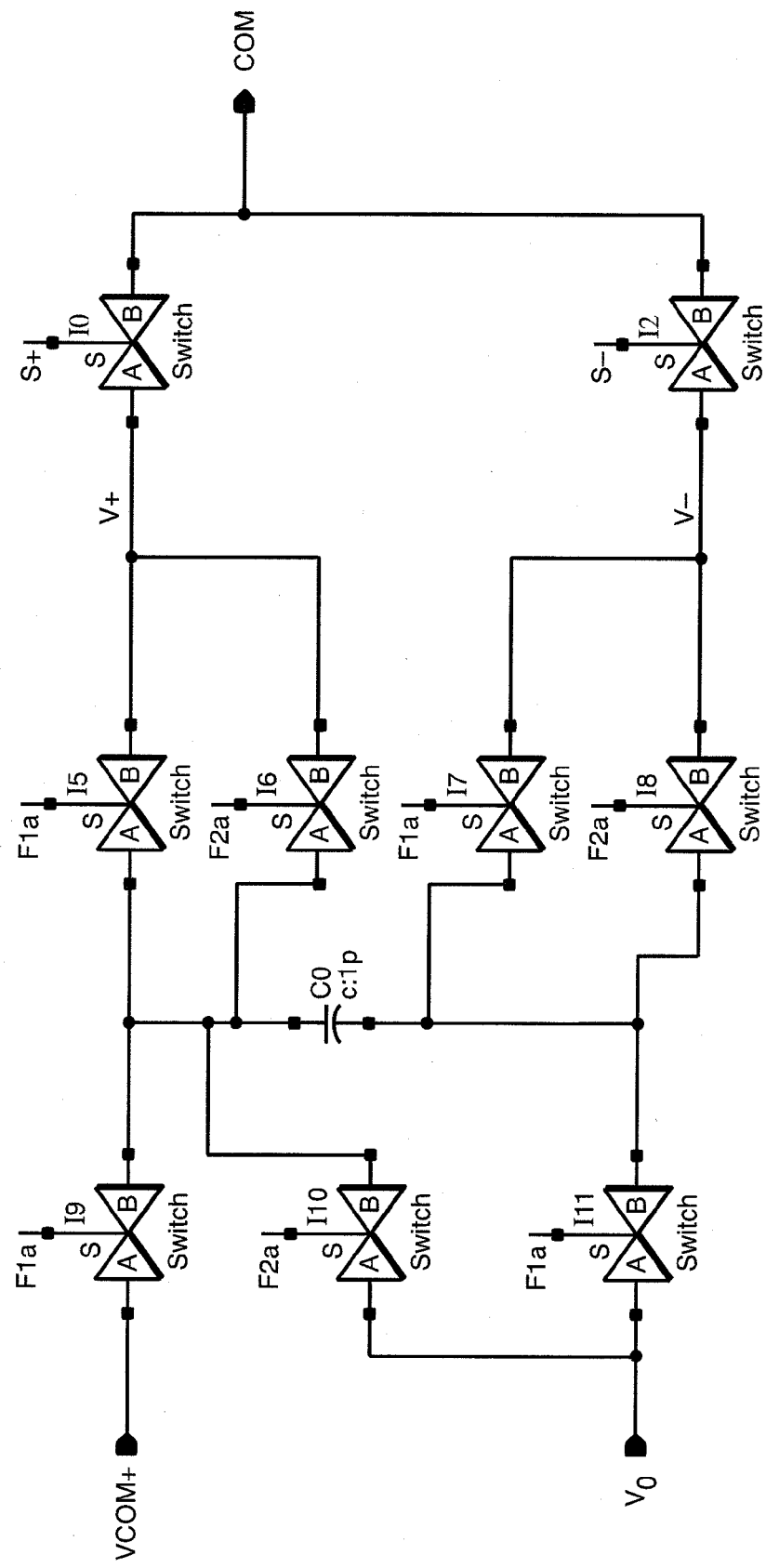
Figure 3D:
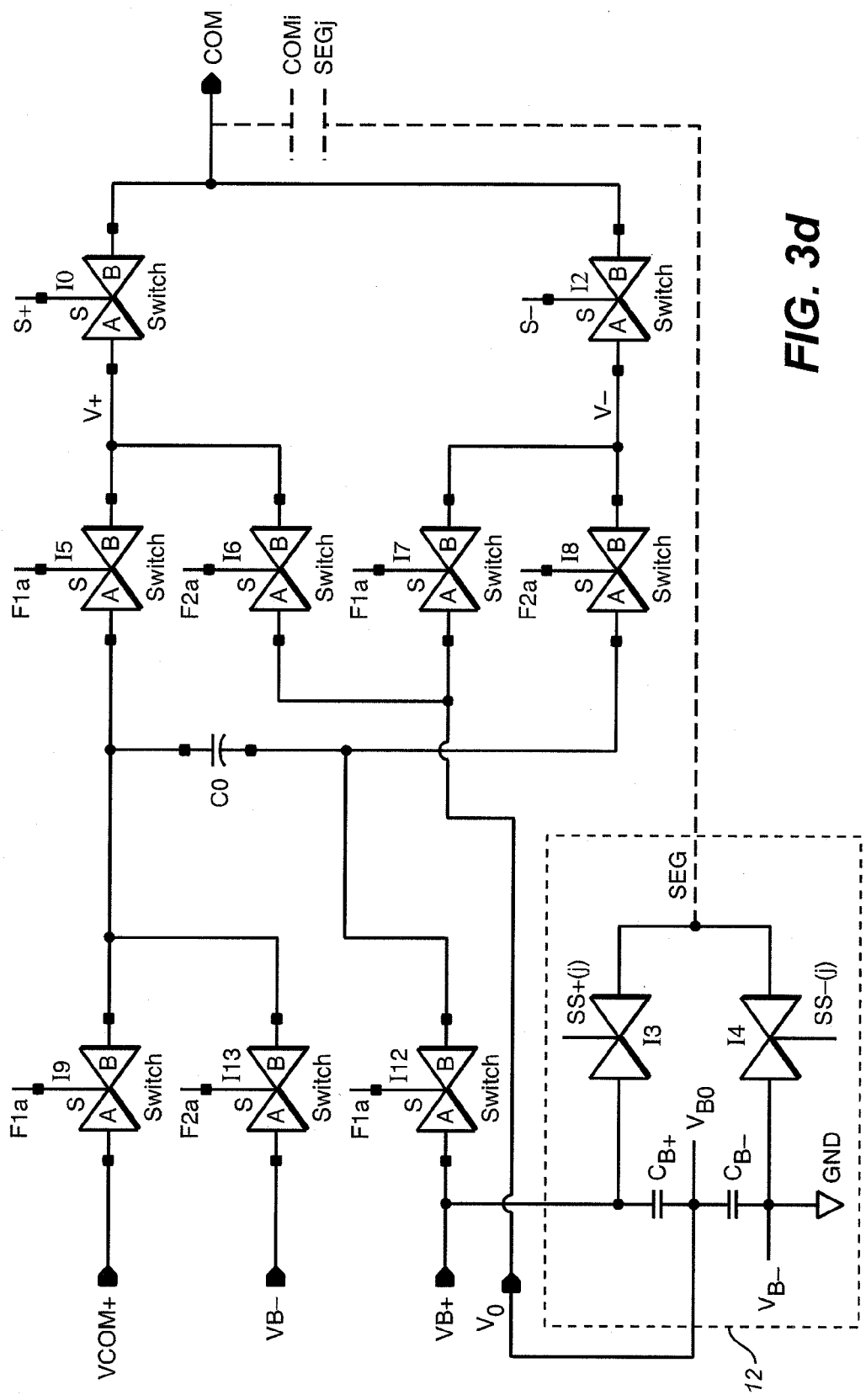

Yet another improvement to FIG. 3c, is illustrated in FIG. 3d. In this embodiment, the connection to V0 is replaced by connection to $V_{B+}$ and $V_{B-}$. In addition $V_{B-}$ is connected to GND while $V_{B+}$ is connected to one single power Supply $V_{B2}$. This improved scheme further reduces the complexity of power supply for $V_{B+}$, $V_{B-}$. In addition, the connection of $V_{COM}$ power supply to $V_{B+}$ and $V_{B-}$ allows the current used in supplying $V_{COM}$ to flow through the storage capacitor for $V_{B+}$ (and $V_{B-}$) and the capacitor formed by the row and column electrodes COMi, SEGj (shown in dotted lines in FIG. 3d) that are addressed at a particular pixel and be reused by the column/SEG electrode drivers for subsequent addressing. A further advantage of moving $V_{COM}$ connection away from V0 is that V0 serves the critical role of establishing balance between $V_{B+}$ and $V_{B-}$ in order to minimize DC voltage as seen across pixel electrodes. If the loading of VCOM is through node V0, then all the row/COM scanning current will be loaded on V0, which make balancing more difficult to achieve and a strong voltage follower necessary to drive V0. When the VCOM is connected to $V_{B+}$ and $V_{B-}$, V0 loading will come completely from column/SEG via LCD pixel capacitance coupling (e.g. COMi, SEGj in FIG. 3d), which is, by definition of capacitor coupling, DC free, and a device driving node V0 can be very weak (just enough to handle $C_{B0}$ leakage and the unbalanced part of the coupled signals).

Current Reuse

It will be noted that in FIG. 3b, 3c or 3d, the low voltage supply system $V_{BIAS}$ involves the use of capacitor $C_{B+}$ and $C_{B-}$. When a SEG electrodes swing from $V_{B+}$ to $V_{B-}$, or vise versa, a current is coupled to the node V0 via the LCD panel capacitance. This current will be a "source" current (flowing out from V0 node) for $V_{B+}$ to $V_{B-}$, transition and "sink" current (flowing into V0 node) for $V_{B-}$ to $V_{B+}$ transition. As just discussed above, these currents are intrinsically balanced, and therefore result in no DC in the long term. Now, if a sufficiently large capacitor (for example over 150× the total LCD panel load capacitance) is connected between V0 and ground, then another very important characteristics will emerge, which is current reuse: the current used by one row of pixels for transitions from, say $V_{B+}$ to $V_{B-}$ in one field will supply the same row's transition from $V_{B-}$ to $V_{B+}$ in the next field. Essentially, the currents pulses will be used twice in two consecutive fields, but temporarily stored in the capacitor connected to V0. This is especially true for almost all passive LCD display applications where the displayed image is essentially static and field to field image change is very limited. Another way of looking at the current reuse, is to see the voltage being halved at each of the above transition (flowing first from $V_{B+}$ to V0 and then from V0 to $V_{B-}$, and the V0 will stay essentially unchanged, assuming the load current produce negligible DC drift on V0). In either perspective, the power consumption is cut in half by the $C_{B+}/C_B$ capacitor connected to V0.

Yet another aspect of this invention is related to the two capacitors $C_{B+}/C_{B-}$ connected between $V_{B+}$ to V0 and V0 to $V_{B-}$. The importance of $C_{B-}$ in terms of current reuse has been discussed above. The significance of $C_{B+}$ can be explained as follows. In order for the above current reuse scheme to work, the V0 node can not be "driven" within two consecutive filed (in other word, V0 can only be driven fairly infrequently, with an average frequency much lower than the field rate, ideally under 15~20 Hz, or about 20% of the field rate) and certain small percentage of V0 drifting (1~2%, +/− balanced) has to be allowed. This low frequency driving requirement is intrinsically conflicting with the requirement of V0 being the mid-point between $V_{B+}$ and $V_{B-}$, which comes from the requirement of no net DC voltage being applied across pixel electrodes, as this will require V0 being controlled at all time.

The addition of $C_{B+}$, which is of substantially the same capacitance as $C_{B-}$, will therefore be important for the accomplishment of the current reuse scheme, as a capacitor voltage divider will be formed by $C_{B-}$ and $C_{B+}$, and any fluctuation occurring across $V_{B+}$ to $V_{B-}$, will automatically be reflected to V0 via the capacitor voltage divider, and therefore help V0 maintain its potential at $(V_{B+}-V_{B-})/2$. Without $C_{B+}$, the fluctuation of $V_{B+}$ will be applied to only one side of V0 and a net DC voltage can easily develop across LCD pixels. Other than using an extremely precise voltage source for $V_{B+}$, which will be costly, the other way to overcome this DC problem is to use a fairly strong driver to fixate V0 at $(V_{B+}-V_{B-})/2$. Since this driver can not differentiate between unwanted drifting and the "good drifting" caused by currents to be reused, it may diminish any power savings, and render the current reuse scheme inoperable.

Floating VBIAS Embodiments

The above embodiments will achieve the desirable power saving by utilizing a separate power supply for SEG/column electrodes with the low voltage VBIAS. However, due to the dual polarity nature of the circuit structure, the CMOS implementation of these schemes in a single chip LCD controller IC still requires the use of triple-well CMOS process (N-Well for P-MOS, when P-MOS operates in positive voltage, and P-Well for N-MOS, when N-MOS operates in the negative voltage). Triple-Well CMOS process can be ~20% more expensive as compared to a otherwise equal twin-Well CMOS process (equal in terms of break down voltage, minimum geometry, layers of conductors, etc.) It is therefore desirable to modify the scheme to allow the more economical process to be used.

Referring the field-inversion IAPT driving scheme in FIG. 2a, it is observed that, during each field, the voltage swing of SEG/column is limited to be a relatively small voltage, on both sides of (i.e. above and below) the non-scanning voltage (either V5 or V2, depends on the polarity of scanning COM/row pulses). It is therefore desirable to provide a "floating" VBIAS power supply system for the column/SEG switching needs (referring to FIG. 4a) during each field in such a way that, this "floating" power supply will substantially maintain its source voltage ($V_{B+}/V_{B0}/V_{B-}$, or VBIAS for short) stability and supply the current necessary to support the electrode swing between V6–V4 during even fields and V1–V3 during odd fields. With this "floating" VBIAS power supply, then the IAPT folded driving scheme can be used and this allows a complete LCD driving system to be build using a single polarity LCD driving system to be built using twin-well CMOS process.

Figure 4A:
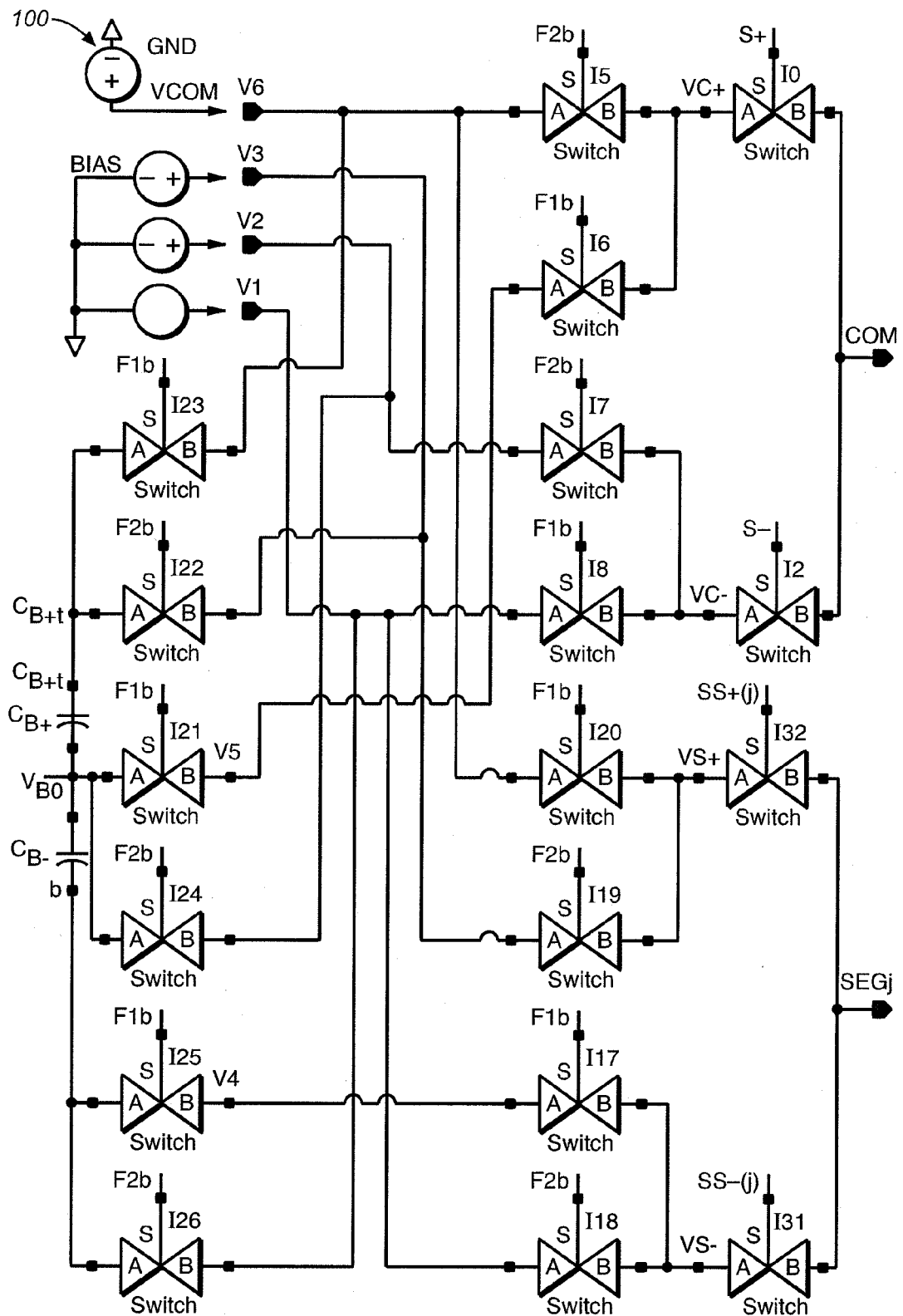
FIG. 4a is a schematic circuit diagram of a power supply circuit for generating electrical potentials for driving a LCD with electrical potentials that float with a voltage supplied by a power supply to illustrate yet another embodiment of the invention.

A preferred embodiment of this "floating" VBIAS supply system 100 comprises a dedicated fixed high voltage VCOM power supply, a VBIAS power supply and a switching circuit for generating certain appropriate electrical potentials for driving the COM or row and SEG or column electrodes. System 100 is shown in FIG. 4a, where node V6 is connected to a dedicated fixed high voltage VCOM power supply supplying a voltage V6, and nodes V3/V2/V1 are connected to a VBIAS power supply to supply the three voltages V3/V2/V1. The voltage level for V1 is typically GND and V3−V2=V2−V1=VBIAS. Control signal F2b is the inverse of F1b (FIG. 4b), with a tiny gap between the ON portions of these two signals to guarantee that no simultaneous turn ON of both power paths is possible.

In the odd fields, F2b is "1", switches 122, 124, 126 are ON, and capacitors $C_{B+}/C_{B-}$ are connected to V3/V2/V1, and system 100 will supply the voltage source to produce SEG/column driving signals between V1 ⇔V3, and COM/row scanning pulses between V2 ⇔V6.

In the even fields, F1b is "1", capacitors $C_{B+}/C_{B-}$ are disconnected from V3/V2/V1, and switch I23 connects the top terminal $C_{B+}$t of $C_{B+}$ to V6, which pulls up the other two terminals $V_{bo}$, $C_{B-}$b of capacitors $C_{B+}/C_{B-}$, assuming $C_{B+}/C_{B-}$ capacitance is substantially higher than the loading current on nodes V5 and V4 generated by switching activities of SEG/column drivers I31/I32, then $C_{B+}/C_{B-}$ will function as a steady voltage source for V5 and V4 through switch I21 and I25. With V6, V5, V4, the system 100 driving SEG/column electrodes (only one pair of drivers is shown for one channel) will produce driving signals between V6 ⇔V4, while the system 100 will produce V5 ⇔V1 scanning pulses.

During the even field, since the SEG/column driving power comes entirely from capacitors $C_{B+}/C_{B-}$, for the above system to operate properly under all display patterns, the capacitance of $C_{B+}/C_{B-}$, needs to be substantially (20× ~50×) larger than (the sum of the pixel capacitance)× (maximum possible SEG/column electrode transitions). For a 100×200 pixel LCD panel, assuming each pixel has a cell capacitance of 2 pF, then the above calculation will imply the capacitance of $C_{B+}/C_{B-}$ needs to be (20×~50×)×2 pF×100×200×50=40~100 uF, where 50=100/2 is the maximum possible SEG/column transition, happen when the pattern is black/white interleaved lines or checker board.

This capacitance requirement is very high and capacitors with such high capacitance values are generally high leakage, electrolytic type capacitors, and therefore are undesirable for ultra-low power battery operated devices.

Figure 4B:
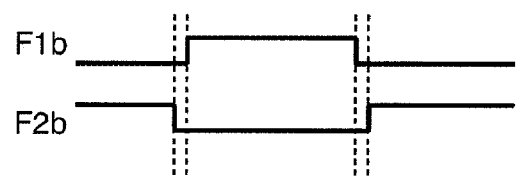
Figure 4C:
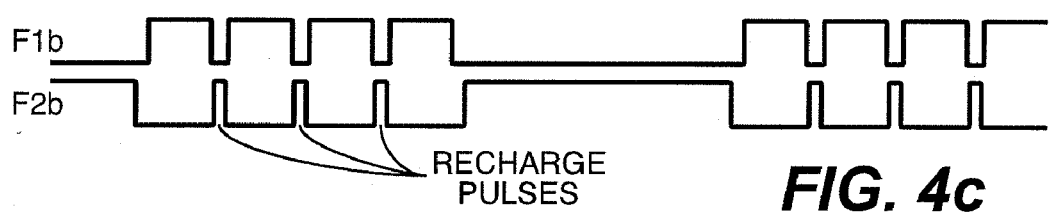

An improvement based on the same circuit as the embodiment of FIG. 4a is to modify the power source management signal F1b/F2b, and insert "recharge pulses" in F2 pulses during the even field such that $C_{B+}/C_{B-}$ will be recharged periodically (FIG. 4c). For example, by inserting such recharge pulses per row scanning period, the calculation for the capacitor required will reduce to: (20×~50×)×2 pF×100× 200×50/100=0.4~2 uF. This range of capacitance can be provided by ceramic capacitor which has negligible leakage current and are in very compact SMD (surface mount device) packages.

Another important factor for this scheme to function is the utilization of the intrinsic capacitances of LCD panels. During the brief periods where the recharging pulses are asserted during the even field, in order for the intrinsic capacitance of the LCD to perform as the holding capacitor for the SEG/column signal until capacitor $C_{B+}/C_{B-}$ is reconnected to produce V5/V4. To achieve this, the output of SEG/column driver portion is temporarily turned-off by setting both SS+ and SS− to "0", and therefore render the SEG/column drivers at a high impedance state to preserve the charge stored in the intrinsic capacitance of the LCD.

With the above structure, all control signals and switches will operate in the positive (or negative) voltage range (relative to GND). This is particularly advantageous where the structure is implemented as an integrated circuit, since the operating voltages can be all positive or negative in reference to the substrate potential. Therefore, other than the capacitors $C_{B+}/C_{B-}$, all control signals and switches can be implemented by a conventional twin-Well CMOS process.

Practically all varieties of commercial passive LCD driving systems involve an orthogonal driving waveform which generally comprises a low voltage swing SEG/column driving system, and a high voltage pulses COM/row scanning system. The relative magnitude between SEG/column and COM/row scanning is generally decided by $\sqrt{Mux}$, where Mux is the multiplexing rate. For single row scanning system such as APT or IAPT driving schemes, the Mux rate equals the number of rows of the LCD. In MLA (multiple line addressing) driving schemes, Mux=Row/L, where L is the number of rows driven simultaneously at each row scanning period.

Because of significant difference of voltage levels between these two voltage requirements, it is usually undesirable to share one voltage supply between the SEG/column drivers and COM/row drivers. This invention introduces several embodiments for driving passive LCDs using two sets of power supplies to reduce the total power consumption of the LCD display system (including the power consumed by the LCD panel and by the driver). In addition, this invention describes several suitable circuit structures and control signal techniques for CMOS implementation to allow effective IC implementation of the introduced concept/method.

Although the above discussion is limited in its scope, the application of the power system structure system can be expanded to other types of passive LCD driving systems such as pulse-width modulation of SEG/column signals, frame-rate corrected gray-shade modulation and various MLA or active addressing methods. In each of the derived applications, the voltage levels need to be adjusted to optimally conserve the power, and the interaction with driving signals (especially SEG/column) needs to be properly managed to minimize the impact of the image quality.

In the embodiments of FIGS. 3a–3d, a first power supply is used to supply electrical potentials dedicated for driving row or column electrodes, and a second power supply separate from the first is used to generate electrical potentials dedicated and suitable for driving a column or SEG electrodes. In the embodiment of FIGS. 4a–4c, however, it will be noted that the power sources V6, V3, V2 and V1 are used in combination for generating electrical potentials suitable for driving both row and column electrodes. Thus as described above, capacitors $C_{B+}/C_{B-}$ in combination with the voltage sources V6, V3, V2 and V1 are used to generate electrical potential V5 for driving the row electrodes as well as electrical potential V4 for driving the column electrodes.

It will be noted that in the description herein concerning embodiments employing capacitors, a power supply supplying a particular voltage is described as charging the capacitor to the same voltage. In practical circuits, however, it is understood that a capacitor is charged in a practical time frame to a desired voltage which is typically lower than the voltage supplied by the power supply. For example, if the two capacitors $C_{B+}$ and $C_{B-}$ are to be charged to 1.2 volts across each of the two capacitors, the voltage supply that is used to charge the two capacitors may need to supply a voltage of about 3.0 volts, rather than 2.4 volts in a practical implementation. It will be understood that, in all of the embodiments of the invention described herein involving the charging of capacitors, even though the description of such embodiments may indicate that the capacitors are charged to the same voltage as that supplied by the power supply, it will be understood that in actual practice, the two voltages are only substantially the same, preferably, with the voltage supplied by the power supply slightly higher than that of the desired voltage to which the capacitor is to be charged.

Figure 5A:
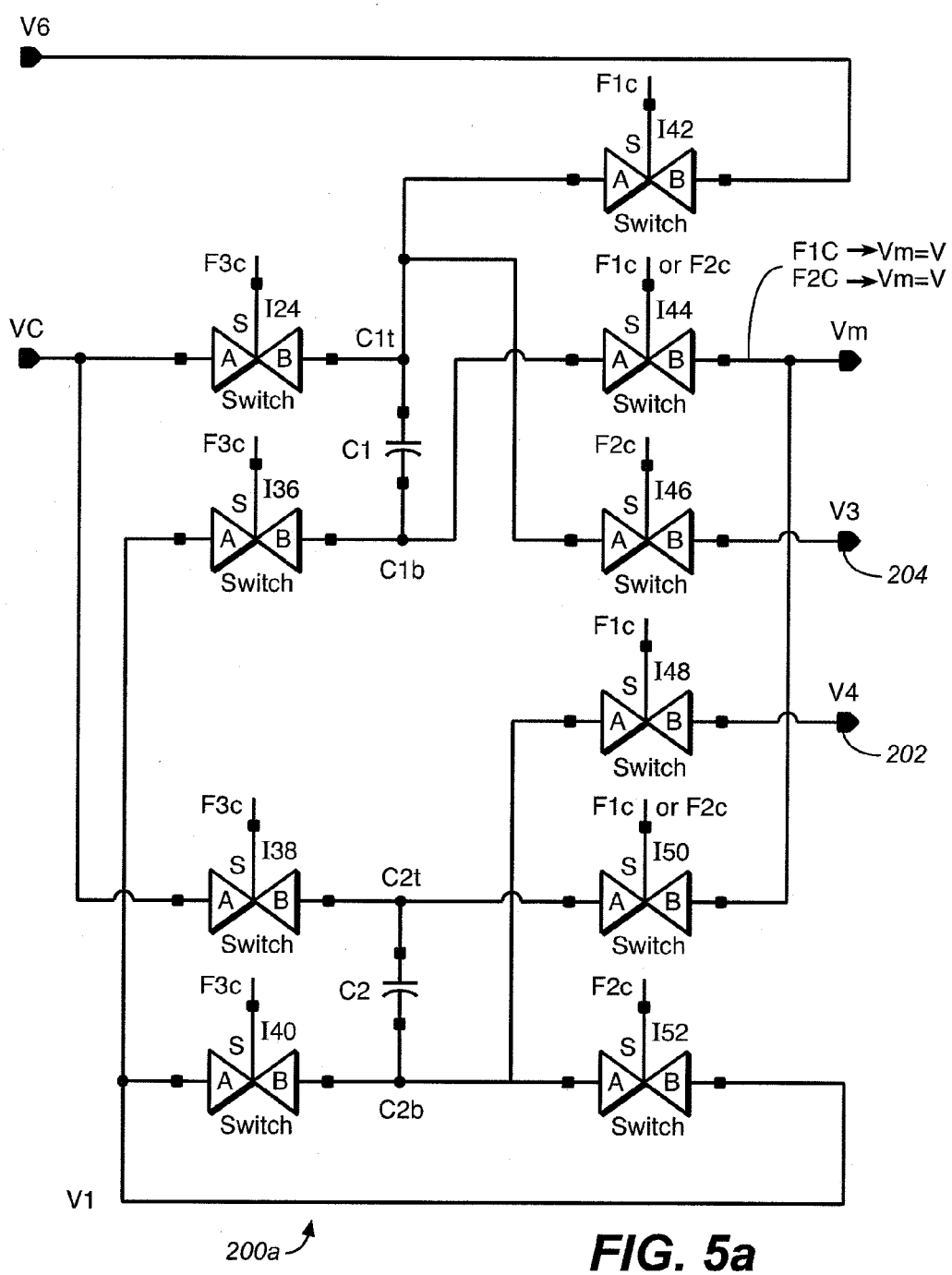
FIGS. 5a and 5b together illustrate a power supply circuit for generating electrical potentials suitable for driving the row and column electrodes of an LCD to illustrate a preferred embodiment of the invention.
Figure 5B:
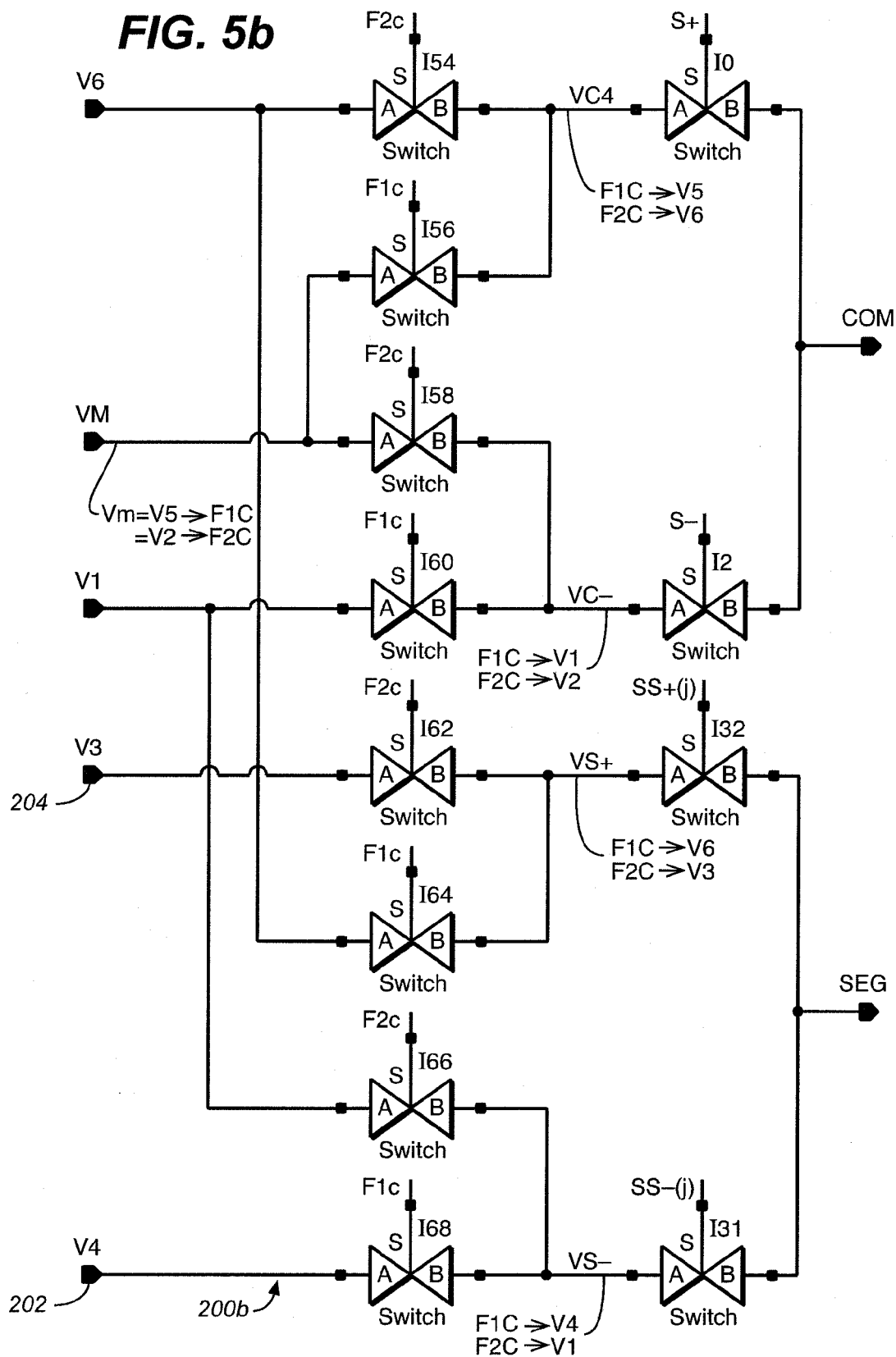

FIGS. 5a and 5b together are a schematic circuit diagram of a power supply circuit for driving the LCD to illustrate the preferred embodiment of the invention. As shown in FIGS. 5a and 5b, the overall circuit of the power supply system may be naturally divided into two portions: a first portion 200a for generating electrical potentials suitable for driving row and/or column electrodes and a second portion 200b for applying the electrical potentials supplied or generated by portion 200a to the row and column electrodes at the appropriate times. The first portion 200a is shown in FIG. 5a. As shown in FIG. 5a, three voltages are provided by two or more power sources: V6, VC and V1, where V1 may simply be ground potential. Two capacitors C1 and C2 are employed for storing energy during a first phase of the operation of combined circuit 200a, 200b. During the second phase, the energy stored in the capacitors is then used, together with the power sources V6, V1, for generating electrical potentials suitable for driving row and/or column electrodes.

The voltage VC is chosen so that the voltage difference between VC and V1 is substantially equal to the amplitude of the voltage difference between non-scanning row electrodes and column electrodes. Thus, during the first phase of operation of the combined circuit 200a, 200b, the control signal F3c is applied to switches I34, I36, I38 and I40, turning on these switches, so that capacitors C1 and C2 are connected in parallel to the voltage VC and V1. Terminals C1t and C2t of C1 and C2 are thus charged to voltage VC and the remaining terminals C1b and C2b of the two capacitors are at the reference voltage V1.

During the second phase of the operation of the combined circuit 200a, 200b, control signal F3c is pulled low thereby turning off switches I34–I40. Then the control signal F1c or F2c is pulled high. Switches I44, I48 are of the type that they will turn on whenever either F1c or F2c is high. For convenience in description, it is assumed that F1c is pulled high first and not F2c. Then switches I42, I44, I48, I50, I56, I60, I64 and I68 are turned on. This causes terminal C1t of capacitor of C1 to be pulled to voltage V6. Since capacitor C1 has previously been charged during phase 1 to a voltage difference of (VC–V1) between its terminals, then the other terminal C1b of capacitor C1 is thereby also pulled to a value V5 so that the voltage difference (V6–V5) equals (VC–V1). The voltage V5, however, will be floating since it is not connected to any one of the three voltage supply nodes V6, VC and V1. Node VM will therefore be at voltage V5 through open switch I44. Terminal C2t of capacitor C2 is also connected to node VM so that it is pulled to voltage V5 and its other terminal C2b is pulled to a value V4 so that the voltage difference (V5–V4) is equal to the voltage difference (VC–V1). This is the case since the capacitor C2 has been charged during the previous phase 1 to this voltage difference. Thus, the voltage V5 passes through switch I44 and appears at node VM and the voltage V4 passes through switch I48 and appears at node 202.

In reference to FIG. 5b, the voltage V5 appearing in node VM passes through switch 156 and appears at node VC+ and reference voltage V1 passes through switch I60 to appear at node VC−. Therefore, by controlling switches I0 and I2 by means of control signals S+ and S− as before, the voltages V6 and V1 are applied to one or more COM or row electrodes. The voltage V6 also passes through switch I64 and appears at node VS+ and the voltage V4 at node 202 passes switch I68 to appear at node VS−. As before, by applying suitable timing control signals SS+(j) and SS−(j) to control switches I32 and I31, appropriate pulses of V6<=>V4 are applied to the corresponding column electrode SEGj. In reference to FIG. 2a, the above described driving voltage waveforms are the ones suitable for field 2×N, where the electrical potentials applied to the COM electrodes are between V5 and V1 and those applied to the column electrodes are between V6 and V4. As noted above, the voltages V5 and V4 are not connected to any power supply during this time and, therefore, float in reference to voltage V6 through the capacitors C1 and C2.

During the second phase, during another field addressing cycle, such as field 2×N+1 in FIG. 2a, the control signal F3c remains low, control signal F1c is pulled low and control signal F2c is pulled high. This turns off switches I42, I48, I56, I60, I64 and I68, and turns on switches I46, I52, I54, I58, I62 and I66. Switches I44 and I50 remain on whenever either one of the control signals F1c and F2c is high. Terminal C2b of capacitor C2 is pulled to V1 through switch 152. Since the capacitor C2 has previously been charged during the first phase to (VC−V1), the terminal C2t will be pulled to a voltage V2 where (V2−V1) is equal to (VC−V1), where V2 floats in relation to V1 through capacitor C2. This voltage V2 passes switch 150 and appears at node VM. Terminal C1b of capacitor C1 is connected to VM through open switch I44 so that terminal C1b is also at voltage V2. Since the capacitor C1 has previously been charged to a value (VC−V1) during the first phase, the terminal C1t of capacitor C1 will be pulled to a value V3, where (V3−V2) is equal to (VC−V1), where V3, therefore, also floats with V2 and V1 through capacitors C1 and C2.

Figure 1:
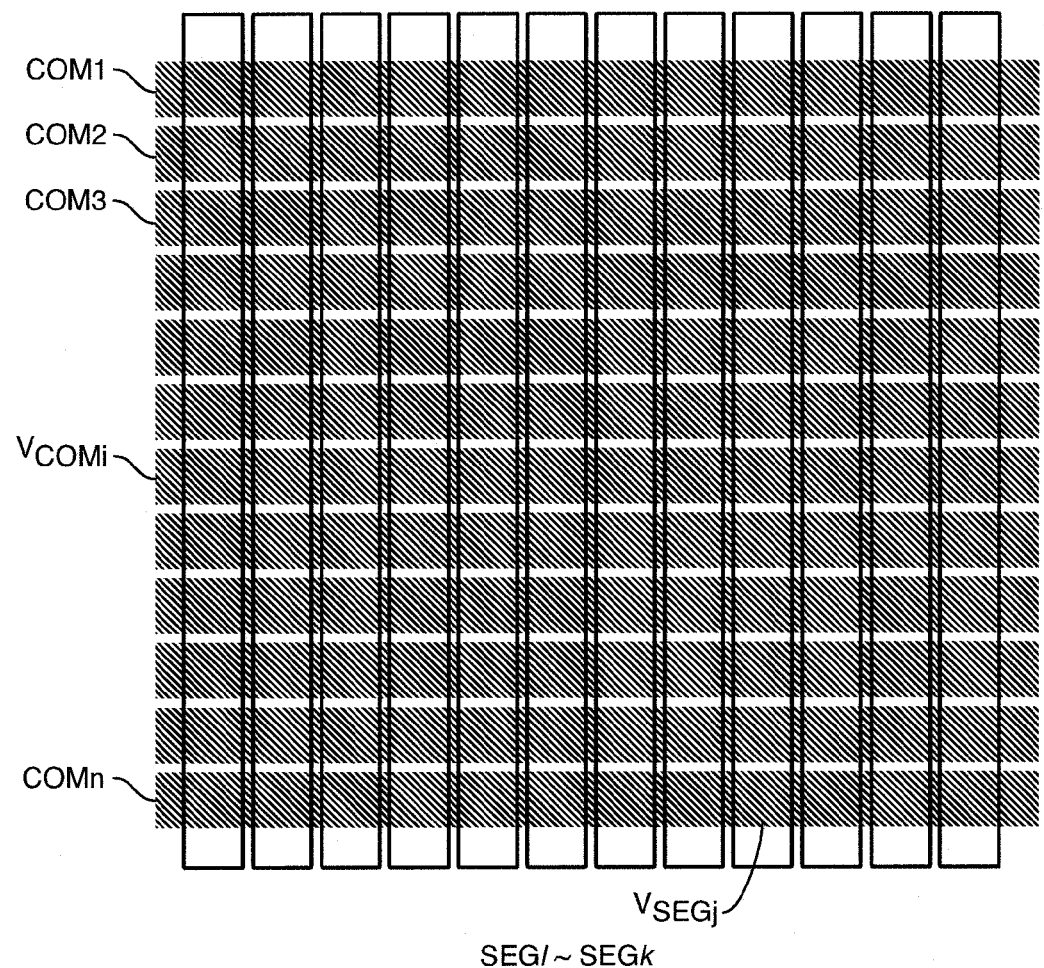
FIG. 1 is a schematic view of a LCD panel and its row electrodes labeled COM 1, . . . COM n in FIG. 1, and column electrodes shown as vertical rectangles labeled SEG 1~SEGk in FIG. 1.

The voltage V3 passes through switch I46 and appears at node 204. In reference to FIG. 5b, voltage V2 appearing at node VM passes through switch I58 and appears at node VC− through switch I58 and the voltage V6 passes through switch I54 to appear at node VC+. Therefore, by means of timing control signals S+ and S−, the voltages V6 and V2 are applied through switches I0 and I2 to a selected COM electrode. Reference voltage V1 passes through switch I66 and appears at node VS− and the voltage V3 passes switch I62 to appear at node VS+. As before, by means of timing control signals SS+(j) and SS−(j) controlling switches I32 and I31, respectively, the voltages V3 and V1 are applied to the corresponding electrode SEGj, where j ranges from 1 to the maximum number of column electrodes, such as k in FIG. 1. The operation of the combined circuit 200a, 200b of FIGS. 5a, 5b during the two phases is summarized in the table below, where the underlined voltages are the ones that are floating:

|     | F3c | F1c | F2c |
| --- | --- | --- | --- |
| C1t | VC | V6 | V3 |
| C1b | V1 | V5 ($V_C - V_1 = V_6 - V_5$) | V2 ($V_C - V_1 = V_3 - V_2$) |
| C2t | VC | V5 | V2 ($V_C - V_1 = V_2 - V_1$) |
| C2b | V1 | V4 ($V_C - V_1 = V_5 - V_4$) | V1 |

With the above structure in FIGS. 5a, 5b, all control signals and switches will operate in the positive (or negative) voltage range (relative to GND). This is particularly advantageous where the structure is implemented as a single-chip integrated CMOS circuit, since the operating voltages can be all positive or negative in reference to the substrate potential. Therefore, other than the capacitors C1 and C2, all control signals and switches can be implemented by a conventional twin-Well CMOS process.

In the embodiment of FIGS. 5a, 5b, the operation of the circuit has two distinct phases: a first phase during which one or more capacitors is charged and during which no electrical potentials are applied to the row or column electrodes. This is followed by phase 2 where one of the two terminals of each capacitor is connected to a voltage supply so that the electrical potential of the remaining terminal of the capacitor is pulled to a value equal to the voltage difference (VC−V1) from that of the voltage supply. One or more of the voltage supplies V6 and V1 from the power supplies and one or more of the generated floating voltages at such other terminal of each of the two capacitors are then used to control and drive the row and column electrodes.

In other embodiments described above, such as those in FIGS. 3c, 3d and 4a, there are also two phases where during the first phase, one or more capacitors is charged, and where during the second phase, a floating voltage at a terminal of the capacitor(s) and one or more supply voltages are used for driving row and/or column electrodes. In such embodiments, however, the supply voltage or voltages are also used during the first phase to drive the row and/or the column electrodes. All such variations are within the scope of the invention.

In the embodiment of FIG. 4a, it may be important to employ capacitors $C_{B+}$ and $C_{B-}$ that are of substantially equal value and employ voltage supplies V3, V2, V1 so that (V3−V2) is substantially the same as (V2−V1). This is the case to maintain a zero voltage offset at the column electrodes. In the embodiment of FIGS. 5a, 5b, this is assured since the capacitors C1 and C2 are charged in parallel during the first phase to the same voltage difference. This reduces the tolerances for components that may be used in the drivers so that lower cost components may be used. In the embodiment of FIG. 4a, the two capacitors are charged when they are placed in series whereas in the embodiment of FIGS. 5a, 5b, the two capacitors C1 and C2 are charged when they are placed in parallel between the same two voltage sources.

Thus, the feature common to the embodiments in FIGS. 3c, 3d, 4a, 5a and 5b is that two or more power supplies together with a circuit including an energy storage device are employed to generate electrical potentials for driving row and column electrodes. The circuit causes at least one of the electrical potentials so generated to float with a voltage supplied by one of the power supplies. Thus, in the embodiment of FIGS. 3c, 3d, when the reference voltage V0 is connected to node V+, thereby putting one terminal of the capacitor C0 to the reference voltage, the other terminal of capacitor. C0 is pulled to the floating value—VCOM+ or VCOM−.

In the embodiment of FIG. 4a, when the capacitors $C_{B+}$ and $C_{B-}$ are pulled up by voltage supply V6, this causes the node between the two capacitors and the remaining terminal of capacitor CB to also be pulled to floating values useful for driving the row or column electrodes. Thus, the voltage value at the node between the two capacitors is pulled to a value V5 where (V6−V5) is substantially equal to (V3−V2) which is the voltage difference by which the capacitor $C_{B+}$ has been charged during the previous phase. At the same time, the voltage at node VS− will also be pulled up to the voltage at the bottom terminal $C_{B-t}$ which is at a voltage V4, where (V5–V4) is substantially the same as (V2–V1). This is the case since capacitor $C_{B-}$ has previously been charged during the previous phase to (V2–V1).

Yet another feature common to the embodiments of the invention in FIGS. 3c, 3d, 4a, 5a and 5b is that the driver circuit as a whole experiences a voltage dynamic range which does not substantially exceed the amplitude of the voltage pulses applied to the row electrodes. In reference to FIG. 2b, for example, where two separate voltage sources are employed to generated the positive and negative going voltage pulses for application to row electrodes, the power supply circuit would experience a voltage dynamic range equal to the sum of the amplitudes of the positive and negative going pulses. Since the positive and negative going pulses should have equal amplitudes for zero DC offset, this means that such power circuit would experience twice the amplitude of the voltage pulses applied to the row electrodes. In the example shown in FIG. 2b, the dynamic range experienced by the power circuit would be equal to $V_{COM+}$ which is equal to $V_{COM-}$. In the embodiments of FIGS. 3c, 3d, 4a, 5a and 5b, since capacitors have been used to enable a single power supply to generate both the positive and negative going voltage pulses for row electrodes, the voltage dynamic range seen or experienced by the power supply circuit as a whole is substantially equal or not significantly higher than the amplitude of the positive and negative going pulses applied to the row electrodes. In other words, such feature enables the total voltage dynamic range to be reduced as in the case of IAPT, while at the same time vastly reducing the power consumption by the driver when compared to IAPT.

While the invention has been described above by reference to various embodiments, it will be understood that changes and modifications may be made without departing from the scope of the invention, which is to be defined only by the appended claims and their equivalents.

What is claimed is:

1. A circuit for driving a liquid crystal display, said display comprising an array of elongated row and an array of elongated column electrodes arranged transverse to the row electrodes, wherein overlapping areas of the two arrays of electrodes define pixels of the display when viewed in a viewing direction, said apparatus comprising:

a control device; and at least one energy storage device supplying electrical potentials and energy to the row and column electrodes according to periodic addressing cycles of the liquid crystal display, causing the display to display desired images, wherein the control device causes the at least one energy storage device to be charged in a first phase, and causes substantially all of the energy consumed by the row or column electrode(s) to be supplied by the at least one energy storage device in a later second phase, wherein the at least one energy storage device generates electrical potentials and energy for application to the row and column electrodes during the second phase, wherein timing of the generation is in a predetermined timing relationship to the addressing cycles;

said circuit comprising two energy storage devices each having two terminals, wherein the control device causes the two energy storage devices to be connected in parallel to at least one of a plurality of power sources during the first phase to charge the energy storage devices, so that they are charged to substantially the same voltage across their terminals, wherein during the second phase the control device causes the two energy storage devices to supply a first electrical potential to the row electrodes, and a first one of the two energy storage devices to supply to the column electrodes a second electrical potential below the first electrical potential by an amount and a second one of the two energy storage devices to supply to the column electrodes a third electrical potential above the first electrical potential by substantially the amount.

2. The circuit of claim 1, wherein at least one of the electrical potentials supplied to the row or column electrodes by the at least one energy storage device changes with a voltage supplied or caused to be supplied by at least one of a plurality of power sources, so that a desired image is displayed at pixels covered by one or more column electrodes with electrical potential(s) that are powered by said at least one energy storage device.

3. The circuit of claim 1, wherein the amount is substantially equal to the voltage across the terminals of the devices.

4. The circuit of claim 1, wherein the control device is such that the row electrodes are substantially not receiving any energy from any energy source other than the at least one energy storage device during some addressing cycles when the display is caused to display desired images.

5. The circuit of claim 1, wherein the control device is such that the column electrodes are substantially not receiving any energy from any energy source other than the at least one energy storage device during some addressing cycles when the display is caused to display desired images.

6. The circuit of claim 1, wherein the at least one energy storage device comprises a capacitor.

7. The circuit of claim 1, wherein the column electrodes are not connected to any power source during the first phase wherein a desired image is displayed at pixels covered by the column electrodes not connected to any power source.

8. The circuit of claim 1, wherein the control device connects the at least one energy storage device to supply energy to the row or column electrode(s) in the second phase, and connects a power source to the column electrodes, causing electrical potential(s) of one or more column electrodes to change with a voltage supplied or caused to be supplied by at least one of a plurality of power sources for displaying an image at pixels covered by the one or more column electrodes.

9. The circuit of claim 1, wherein during the second phase the control device causes the two energy storage devices to supply two different sets of electrical potentials: a first set comprising the first, second and third electrical potentials, and a second set comprising a fourth electrical potential supplied to the row electrodes, a fifth electrical potential supplied to the column electrodes below the fourth electrical potential by a second amount and a sixth electrical potential above the fourth electrical potential by substantially the second amount.

10. The circuit of claim 9, wherein the first and second amounts are substantially the same.

11. The circuit of claim 1, wherein the control device causes the at least one energy storage device to generate two different sets of electrical potentials during different time intervals in the second phase for application to the row and column electrodes.

12. The circuit of claim 11, wherein the control device causes the at least one energy storage device to be connected to at least two different reference electrical potentials during the different time intervals in the second phase, so that at least one electrical potential in a first one of the at least two sets changes with a first one of the at least two different reference electrical potentials, and at least one electrical potential in a second one of the at least two sets changes with a second one of the at least two different reference electrical potentials.

13. A circuit for driving a liquid crystal display, said display comprising an array of elongated row and an array of elongated column electrodes arranged transverse to the row electrodes, wherein overlapping areas of the two arrays of electrodes define pixels of the display when viewed in a viewing direction, said apparatus comprising:

a control device;

two power sources; and at least one energy storage device and the power sources supplying electrical potentials to the row and column electrodes according to periodic addressing cycles of the liquid crystal display, causing the display to display desired images, wherein the control device causes the at least one energy storage device to be charged in a first phase by means of the two power sources, and connects said at least one energy storage device to the row or column electrode(s) in a later second phase, wherein the at least one energy storage device generates electrical potentials and energy for application to the row and column electrodes during the second phase, wherein timing of the generation is in a predetermined timing relationship to the addressing cycles said circuit comprising two energy storage devices each having two terminals, wherein the control device causes the two energy storage devices to be connected in parallel to at least one of the two power sources during the first phase to charge the energy storage devices, so that they are charged to substantially the same voltage across their terminals, wherein during the second phase the control device causes the two energy storage devices to supply a first electrical potential to the row electrodes, and a first one of the two energy storage devices to supply to the column electrodes a second electrical potential below the first electrical potential by an amount and a second one of the two energy storage devices to supply to the column electrodes a third electrical potential above the first electrical potential by substantially the amount.

14. The circuit of claim 13, wherein the control device causes said at least one energy storage device to be connected to the row or column electrode(s) in a later second phase so that such row or column electrode(s) is substantially not powered by any energy source other than said at least one energy storage device.

15. The circuit of claim 13, wherein at least one of the electrical potentials supplied to one or more column electrodes by the at least one energy storage device changes with a voltage supplied or caused to be supplied by at least one of the two power sources, so that a desired image is displayed at pixels covered by one or more column electrodes with electrical potential(s) that are powered by said at least one energy storage device.

16. The circuit of claim 13, wherein the amount is substantially equal to the voltage across the terminals of the devices.

17. The circuit of claim 13, wherein the control device is such that the row electrodes are not substantially powered by any energy source other than the at least one energy storage device during some addressing cycles when the display is caused to display desired images.

18. The circuit of claim 13, wherein the control device is such that the column electrodes are not substantially powered by any energy source other than the at least one energy storage device during some addressing cycles when the display is caused to display desired images.

19. The circuit of claim 13, wherein the at least one energy storage device comprises a capacitor.

20. The circuit of claim 13, wherein the control device causes substantially all of the energy consumed by the row or column electrode(s) to be supplied by the at least one energy storage device in the second phase.

21. The circuit of claim 13, said second and third electrical potentials different from the first electrical potential by a first amount, wherein during the second phase the control device causes the two energy storage devices to supply two different sets of electrical potentials: a first set comprising the first, second and third electrical potentials, and a second set comprising a fourth electrical potential supplied to the row electrodes, a fifth electrical potential supplied to the column electrodes below the fourth electrical potential by a second amount and a sixth electrical potential above the fourth electrical potential by substantially the second amount.

22. The circuit of claim 21, wherein the first and second amounts are substantially the same.

23. A method for driving a liquid crystal display, said display comprising an array of elongated row and an array of elongated column electrodes arranged transverse to the row electrodes, wherein overlapping areas of the two arrays of electrodes define pixels of the display when viewed in a viewing direction, said apparatus comprising:

controlling two power sources and at least one energy storage device to supply electrical potentials to the row and column electrodes according to periodic addressing cycles of the liquid crystal display, causing the display to display desired images;

wherein the controlling causes the at least one energy storage device to be charged in a first phase by means of the two power sources, and causes said at least one energy storage device to be connected to the row or column electrode(s) in a later second phase, wherein the controlling causes the at least one energy storage device to generate electrical potentials and energy for application to the row and column electrodes during the second phase, wherein the controlling causes the at least one energy storage device to generate and apply a first electrical potential to the row electrodes, and to generate and apply second and third electrical potentials to the column electrodes, said second and third electrical potentials being different from one another, said second and third electrical potentials different from the first electrical potential by substantially the first amount.

* * * * *